(12) United States Patent
Henderson et al.

(10) Patent No.: US 12,190,657 B2
(45) Date of Patent: Jan. 7, 2025

(54) METHOD AND SYSTEM FOR DETERMINING THAT A FAILURE HAS OCCURRED AT OR IN A WHEEL END BEARING OF A VEHICLE

(71) Applicant: Volvo Truck Corporation, Gothenburg (SE)

(72) Inventors: Leon Henderson, Härryda (SE); Ramachandran Sandrasekaran, Bangalore Karnataka (IN)

(73) Assignee: Volvo Truck Corporation, Gothenburg (SE)

( * ) Notice: Subject to any disclaimer, the term of this patent is extended or adjusted under 35 U.S.C. 154(b) by 255 days.

(21) Appl. No.: 17/909,483

(22) PCT Filed: Mar. 5, 2021

(86) PCT No.: PCT/EP2021/055545
§ 371 (c)(1),
(2) Date: Sep. 6, 2022

(87) PCT Pub. No.: WO2021/180575
PCT Pub. Date: Sep. 16, 2021

(65) Prior Publication Data
US 2023/0109721 A1 Apr. 13, 2023

(30) Foreign Application Priority Data
Mar. 12, 2020 (IN) ............... 202041010659

(51) Int. Cl.
*G07C 5/08* (2006.01)
*B60W 50/02* (2012.01)
(Continued)

(52) U.S. Cl.
CPC ....... *G07C 5/0808* (2013.01); *B60W 50/0205* (2013.01); *F16C 19/386* (2013.01); *B60W 60/0015* (2020.02)

(58) Field of Classification Search
CPC ............ G07C 5/0808; B60W 50/0205; B60W 60/0015; F16C 19/386; F16C 25/06;
(Continued)

(56) References Cited

U.S. PATENT DOCUMENTS 9,416,835 B2 8/2016 Antanaitis et al.
2005/0052074 A1 3/2005 Hennig et al.
(Continued)

FOREIGN PATENT DOCUMENTS

CN 201322045 Y 10/2009
CN 101823482 A 9/2010
(Continued)

OTHER PUBLICATIONS

Intention to Grant for European Patent Application No. 21710442.1, mailed Dec. 13, 2023, 31 pages.
(Continued)

*Primary Examiner* — Behrang Badii
(74) *Attorney, Agent, or Firm* — Withrow & Terranova, PLLC

(57) ABSTRACT

The invention relates to a method of determining that a failure has occurred at or in a wheel end bearing of a vehicle. An estimated value of the temperature of the wheel end bearing is calculated by a processing circuitry. A measured
(Continued)

value of the temperature of the wheel end bearing is acquired by a temperature sensor. The measured value is compared with the estimated value by the processing circuitry. When the measured value deviates from the estimated value by a predefined difference or more, then the processing circuitry determines that a failure has occurred. The invention also relates to a system for determining that a failure has occurred.

15 Claims, 3 Drawing Sheets

(51) Int. Cl.
*F16C 19/38* (2006.01)
*B60W 60/00* (2020.01)

(58) Field of Classification Search
CPC .... F16C 35/067; F16C 19/525; F16C 33/586; F16C 35/063; B60B 2900/212; B60B 2900/3316; B60B 27/00
See application file for complete search history.

(56) References Cited

U.S. PATENT DOCUMENTS

| 2012/0032793 | A1* | 2/2012 | Sonzala | B60T 5/00 |
| | | | | 152/417 |
| 2013/0220502 | A1* | 8/2013 | Hennig | B60C 23/002 |
| | | | | 137/551 |
| 2021/0061027 | A1* | 3/2021 | Da Deppo | B60C 23/041 |
| 2021/0332849 | A1* | 10/2021 | Gravell | B60C 23/00336 |

FOREIGN PATENT DOCUMENTS

| CN | 111458055 A | 7/2020 |
| EP | 1083360 A2 | 3/2001 |

OTHER PUBLICATIONS

Soundhararajan, R. et al., "Online Monitoring of Brake Capability For Heavy Vehicles," Master's Thesis in Automotive Engilneering, 2019, Chalmers University of Technology, Gothenburg, Sweden, 57 pages.
International Search Report and Written Opinion for International Patent Application No. PCT/EP2021/055545, mailed Jul. 7, 2021, 12 pages.

* cited by examiner

METHOD AND SYSTEM FOR DETERMINING THAT A FAILURE HAS OCCURRED AT OR IN A WHEEL END BEARING OF A VEHICLE

This application is a 35 USC 371 national phase filing of International Application No. PCT/EP2021/055545, filed Mar. 5, 2021, which claims the benefit of Indian patent application No. 202041010659, filed Mar. 12, 2020, the disclosures of which are incorporated herein by reference in their entireties.

TECHNICAL FIELD

The invention relates to a method and a system for determining that a failure has occurred at or in a wheel end bearing of a vehicle. The invention additionally relates to a computer program, to a computer readable medium and to a processing circuitry, each of which implements the steps of the method. Furthermore, the invention relates to a vehicle comprising the system.

The invention can be applied in heavy-duty vehicles, such as trucks, buses and construction equipment. Although the invention will be described with respect to a truck, the invention is not restricted to this particular vehicle, but may also be used in other vehicles such as cars.

BACKGROUND

The wheels of a vehicle, such as a truck, are normally connected to a respective wheel end hub. In its turn, the wheel end hub may be connected to a rotatable wheel axle, whereby rotation of the wheel axle is conveyed into rotation of the wheels. The wheel end hub is commonly coaxially mounted to a wheel end bearing which in turn is coaxially mounted around the wheel axle, typically around a spindle enclosing the wheel axle. For a non-driven wheel the wheel end hub is commonly coaxially mounted to a wheel end bearing which in turn is coaxially mounted to a solid steering knuckle. Irrespective of the wheel end bearing being mounted to a spindle or a steering knuckle, it has an inner ring and an outer ring between which bearing elements are provided for enabling relative rotation between the inner ring and the outer ring. The wheel end hub is fixedly connected to one of said rings, typically the outer ring, with which it rotates.

In order to reduce the risk of bearing failure, with adverse and potentially hazardous consequences, it would be desirable to be able to adequately perform a diagnosis of the state of the wheel end bearing.

Today there are various mathematical models for estimating brake temperatures, and such mathematical models may be implemented in an electronic control unit (ECU) of the vehicle. However, those mathematical models are used for estimating brake temperature, in order to detect brake failure rather than bearing failure. For example, high brake temperatures may increase the risk of subsequent fires. Furthermore, the estimations using mathematical models can be inaccurate, due to many uncertainties in the system. In addition, the temperature estimations are based on the assumption of normal operation of the brake mechanism. If the brake mechanism has a failure causing it to behave differently than its nominal behaviour, then such failure may not always be detected.

Although such mathematical models for estimating brake temperatures could be extended to estimate bearing temperatures, there is still a need for an improved diagnosis of the state of the wheel end bearing. In order words, there is a need for a more reliable way of determining that a failure has occurred at or in a wheel end bearing of a vehicle.

SUMMARY

An object of the invention is to provide a method and a system which provide a more reliable way of determining that a failure has occurred at or in a wheel end bearing of a vehicle. This and other objects, which will become apparent in the following disclosure, are achieved by the accompanying independent claims.

According to a first aspect of the invention, the object is achieved by a method according to claim 1. The first aspect of the invention relates to a method of determining that a failure has occurred at or in a wheel end bearing of a vehicle, comprising the steps of:

calculating, using a processing circuitry, an estimated value of the temperature of the wheel end bearing, acquiring, using a temperature sensor, a measured value of the temperature of the wheel end bearing, comparing, using the processing circuitry, the measured value with the estimated value, and determining, using the processing circuitry, that a failure has occurred when the measured value deviates from the estimated value by a predefined difference or more.

The inventive concept is based on the realization by the inventors that if the difference between an actually measured bearing temperature and an estimated bearing temperature (i.e. the value which should reasonably be expected to be present) is large enough, then this may be an indication of a bearing related failure. For instance, when the expected temperature is low, but the measured temperature is much higher, then this would indicate that there is a bearing failure. Put differently, in such cases, there is something causing the bearing to become relatively hot, although the circumstances on which the estimate is based suggest that the temperature should have been lower.

Since the accuracy of for example mathematical models for calculating temperature estimates may not be perfect, there should reasonably be a predefined minimum difference between the measured value and the estimated value, so as to reduce the risk of incorrect determinations of bearing failure. Such predefined minimum difference may suitably be set depending on the type of vehicle, and/or depending on the type of bearings and other components of the wheel end hub and the brake mechanisms. For instance, in some exemplary embodiments, the predefined minimum difference may be 50° C. In other exemplary embodiments the predefined minimum difference may be higher, such as 100° C. or even 150° C.

It should also be noted that the mathematical models for calculating temperature estimates may be dependent on the specific type of vehicle on which the method is implemented, and the specific type of components therein. Thus, it is hardly reasonable to set one global model which should be used for all types of vehicles. For instance, friction and/or heat conductivity is dependent on various factors, such as types of components, types of material in the components, dimensions, etc. Thus, the inventive concept is rather focused on comparing a measured temperature with an estimated temperature, irrespective of which models have been used to calculate the estimated temperature. An estimate is per definition a "good guess", and can therefore give an indication of a reasonable expectation. The inventors have realized that if the measured temperature deviates substantially from what could reasonably be expected under the current driving conditions, then this may be used as an indication of a bearing failure.

The temperature sensor may suitably be configured to transmit to the processing circuitry the measured value or a representation of the measured value. Conversely, the processing circuitry may suitably be configured to receive from the temperature sensor the measured value or a representation of the measured value. Thus, the method may comprise the step of transmitting, to the processing circuitry, the measured value or a representation of the measured value.

In the following, some exemplary embodiments discussing possible placements of the temperature sensor will be presented. It should be noted that these embodiments are valid for both the method of the first aspect and the system of a second aspect of the inventive concept (the second aspect will be discussed in more detail further below).

According to at least one exemplary embodiment, the wheel end bearing comprises an inboard bearing and an outboard bearing, wherein the temperature sensor is located at (or in) the inboard bearing. This is advantageous since placing the temperature sensor at (or in) the inboard bearing facilitates any wiring routing from the temperature sensor and its connection to the processing circuitry, compared to placing the temperature sensor at (or in) the outboard bearing. The inboard bearing is configured to be located closest to a central longitudinal axis of the vehicle. The outboard bearing is configured to be located furthest away from the central longitudinal axis of the vehicle.

According to at least one exemplary embodiment, the temperature sensor is located on an inboard side of the inboard bearing. This further facilitates the wiring routing.

According to at least one exemplary embodiment, the wheel end bearing surrounds a central wheel support member such as a spindle or a steering knuckle, wherein the temperature sensor is located between the inboard bearing and the central wheel support member. This too facilitates the wiring routing.

From the above, it should be understood that in at least some exemplary embodiments, the temperature sensor may communicate with the processing circuitry via a wired connection. However, it is conceivable, in other exemplary embodiments, to instead (or additionally) provide for a wireless communication of signals between the temperature sensor and the processing circuitry.

The expression "processing circuitry" as used above should be understood to include any type of computing device, such as an ASIC, a micro-processor, etc. It should also be understood that the actual implementation of such a processing circuitry may be divided between more than a single device/circuit. For instance, one device/circuit of the processing circuitry may receive the transmitted measurement signals from the temperature sensor, while another device/circuit of the processing circuitry may calculate an estimated value of the bearing temperature, while yet another device/circuit may compare the estimated and measured values, and a further device/circuit may determine that a failure has occurred. Of course, it is also conceivable that the processing circuitry has only one device/circuit which is used for performing all functions.

According to at least one exemplary embodiment, said step of determining comprises:
  determining, using the processing circuitry, that a bearing failure has occurred when the measured value is both higher than the estimated value and deviates from the estimated value by said predefined difference or more. As mentioned above, if the estimated value for the wheel end bearing is of a certain temperature, and the measured value indicates that the actual temperature of the wheel end bearing is considerably higher, then the processing circuitry will determine that there is a bearing failure. This may, for instance, be due to ingress of dirt into the bearing. Another reason for failure may be that grease in the bearing may become hardened at raised temperatures, and will be like sand that will grind the bearing causing an increased temperature and a functional failure. The failure may initially be small, but may become more serious unless appropriate corrective action is taken in due time. If the failure is not taken care of and its development is allowed to proceed for a prolonged time, there may be an increased risk of additional faulty components. For instance, not only a bearing failure, but also a hazardous failure of the spindle/knuckle may develop. Water ingress or undesired heat dissipation may be other reasons for a temperature increase in the bearing and bearing failure.

According to at least one exemplary embodiment, said step of determining comprising:
  determining, using the processing circuitry, that a brake actuator failure has occurred when the measured value is both lower than the estimated value and deviates from the estimated value by said predefined difference or more. Since the temperature rise in the brake hardware (from friction braking) may be transferred to the wheel end bearing through the hub casting, the calculation of the estimated value may suitably include calculating the heat transfer due to braking. Consequently, if the measured value of the temperature of the wheel end bearing is lower than what has been estimated, this may be an indication of inadequate brake actuation. In some exemplary embodiments, there may be provided a brake pressure sensor which provides a brake pressure signal to the processing circuitry based on which the calculations may be made with respect to the heat transfer to the wheel end bearing. This means that a deviation of the measured value from the estimated value may, in at least some exemplary embodiments, indicate that the brake pressure sensor has failed. In other exemplary embodiments, the deviation may indicate that the temperature sensor has failed. Sensor failures may of course be present both in case of too high measured values and/or in case of too low measured values compared to the estimated values.

Suitably, the processing circuitry, when having determined that a failure has occurred, may send an indication in this regard, either pointing out where the failure has occurred, or suggesting one or more possible components where the failure may have occurred. In the latter case, a vehicle repairman may suitably check each indicated components to establish which of the components has faulted.

According to at least one exemplary embodiment, the step of calculating comprises:
  using a mathematical model which estimates:
    change in bearing temperature based on the rotation of the bearing, and
    change in temperature coming from brake hardware, such as from friction braking, and which is transferred to the bearing, such as via a wheel end hub.

The mathematical model may suitably take into account the brake pressure, the wheel speed, deceleration, etc, wherein sensors may provide the relevant data to the processing circuitry, which data may be included in the mathematical model. The mathematical model may include thermal models which take into account the conduction of heat from the brake hardware via the wheel end hardware surrounding the wheel end bearing, e.g. axle, spindle/knuckle, etc. Some examples of different models that may be used for estimating temperatures are presented in the publication *Online Monitoring of Brake Capability For Heavy Vehicles*, by Ramprasad Soundhararajan and Prajwal Devegowdana Koppal Chandrashekar, Department of Mechanics and Maritime Sciences, Chalmers University of Technology, Gothenburg, Sweden 2019.

According to at least one exemplary embodiment, the step of calculating comprises
  using a mathematical model which estimates:
    increase in bearing temperature based on the rotation of the bearing, and
    temperature rise coming from brake hardware, such as from friction braking, and which is transferred to the bearing, such as via a wheel end hub.

According to at least one exemplary embodiment, the method comprises:
  estimating, using the processing circuitry, the brake energy at each time point, and
  inputting, using the processing circuitry, the estimated brake energy into a thermal capacitance model of the brake hardware to estimate a rise or fall in bearing temperature. Suitably, the method may include using a brake pressure sensor and a wheel speed sensor. Exemplary embodiments of the method may comprise receiving, by the processing circuitry, input from these sensors. The processing circuitry may also be provided with (such as in a memory storage) data/knowledge/information about the expected friction coefficient between the brake pad and the brake disk/drum. Any sensor input and stored information may be used by the processing circuitry in the thermal capacitance model for calculating an estimated change in temperature. Furthermore, a thermal model for calculating the heat transfer via e.g. the hub casting to the wheel end bearing may be used by the processing circuitry to estimate the temperature contribution from the brake energy/brake pressure. In addition, the processing circuitry may, for instance, based on the bearing speed, estimate the temperature contribution from the motion of the actual bearing, wherein the processing circuitry may calculate an estimated total temperature change based on the different estimated temperature contributions.

According to at least some exemplary embodiments, the method may be implemented in a human-driven vehicle or in an autonomous vehicle.

If implemented in a human-driven vehicle, then according to at least one exemplary embodiment, the method comprises:
  communicating, from the processing circuitry, to a user interface that a failure has occurred, when said step of determining has determined that a failure has occurred. This is beneficial since a driver may be alerted in due time and take adequate action, such as stopping the vehicle, or driving it to a vehicle workshop for attending to the faulty component, or taking other suitable measures.

If implemented in an autonomous vehicle, then according to at least one exemplary embodiment, the method comprises:
  communicating, from the processing circuitry, to a control unit of the autonomous vehicle that a failure has occurred, when said step of determining has determined that a failure has occurred.

This is beneficial since the control unit of the autonomous vehicle may then take suitable action, such as stopping the vehicle, or driving it to a vehicle workshop, or taking other suitable measures. Furthermore, the control unit may suitably report the failure to a fleet management system, whereby a fleet manager may be informed of the failure.

According to a second aspect of the invention, the object is achieved by a system according to claim 10. Thus, there is provided a system for determining that a failure has occurred at or in a wheel end bearing of a vehicle, comprising
  a processing circuitry configured to calculate an estimated value of the temperature of the wheel end bearing,
  a temperature sensor configured to acquire a measured value of the temperature of the wheel end bearing,
  wherein the processing circuitry is configured to compare the measured value with the estimated value, and
  wherein the processing circuitry is configured to determine that a failure has occurred when the measured value deviates from the estimated value by a predefined difference or more.

The features and advantages of the system according to the second aspect are largely analogous to the method according to the first aspect. Thus, exemplary embodiments of the method of the first aspect may be implemented in the system of the second aspect, and vice versa.

For instance, according to at least one exemplary embodiment of the system, the processing circuitry is configured to determine that a bearing failure has occurred when the measured value is both higher than the estimated value and deviates from the estimated value by said predefined difference or more.

Similarly, according to at least one exemplary embodiment of the system, the processing circuitry is configured to determine that a brake actuator failure has occurred when the measured value is both lower than the estimated value and deviates from the estimated value by said predefined difference or more. In some exemplary embodiments of the system, the processing circuitry may be configured to determine that a brake pressure sensor has failed when the measured value deviates from the estimated value by said predefined difference or more. In some exemplary embodiments of the system, the processing circuitry may be configured to determine that the temperature sensor has failed when the measured value deviates from the estimated value by said predefined difference or more.

Similarly, according to at least one exemplary embodiment, the processing circuitry may be configured to:
  estimate the brake energy at each time point, and
  input the estimated brake energy into a thermal capacitance model of the brake hardware to estimate a rise or fall in bearing temperature.

Suitably, the system may comprise a brake pressure sensor and a wheel speed sensor. Input from these sensors to the processing circuitry, as well as knowledge/information about the expected friction coefficient between the brake pad and disk/drum, may be used by the processing circuitry in the thermal capacitance model for calculating an estimated change in temperature. Furthermore, a thermal model for calculating the heat transfer via, for instance, the hub casting to the wheel end bearing may be used by the processing circuitry to estimate the temperature contribution from the brake energy/brake pressure. In addition, the processing circuitry may, for instance, based on the bearing speed, estimate the temperature contribution from the motion of the actual bearing, wherein the processing circuitry may calculate an estimated total temperature change based on the different estimated temperature contributions.

According to a third aspect of the invention, there is provided a vehicle comprising the system according to the second aspect of the invention, including any embodiments thereof. The advantages of the vehicle according to the third aspect are largely analogous to those of the system according to the second aspect. Some exemplary embodiments of the vehicle are presented below.

According to at least one exemplary embodiment, the vehicle is a human-driven vehicle, wherein the vehicle comprises a user interface, wherein the processing circuitry is configured to communicate to the user interface that a failure has occurred, when the processing circuitry has determined that a failure has occurred.

According to at least one exemplary embodiment, the vehicle is an autonomous vehicle, wherein the vehicle comprises a control unit, wherein the processing circuitry is configured to communicate to the control unit that a failure has occurred, when the processing circuitry has determined that a failure has occurred.

According to a fourth aspect of the invention, there is provided a computer program comprising program code means for performing the steps performed by the processing circuitry in the method according to the first aspect, including any exemplary embodiment thereof. The advantages of the computer program of the fourth aspect are largely analogous to those of the method according to the first aspect.

According to a fifth aspect of the invention, there is provided a computer readable medium carrying a computer program comprising program code means for performing the steps performed by the processing circuitry in the method according to the first aspect, including any exemplary embodiment thereof, when said program product is run on a computer. The advantages of the computer readable medium of the fifth aspect are largely analogous to those of the method according to the first aspect.

According to a sixth aspect of the invention, there is provided a processing circuitry for determining that a failure has occurred at or in a wheel end bearing of a vehicle, the processing circuitry being configured to perform the steps performed by the processing circuitry in the method according to the first aspect, including any exemplary embodiment thereof. The advantages of the processing circuitry of the sixth aspect are largely analogous to those of the method according to the first aspect.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.
In the Drawings.

DETAILED DESCRIPTION OF EXAMPLE EMBODIMENTS OF THE INVENTION

Figure 1:
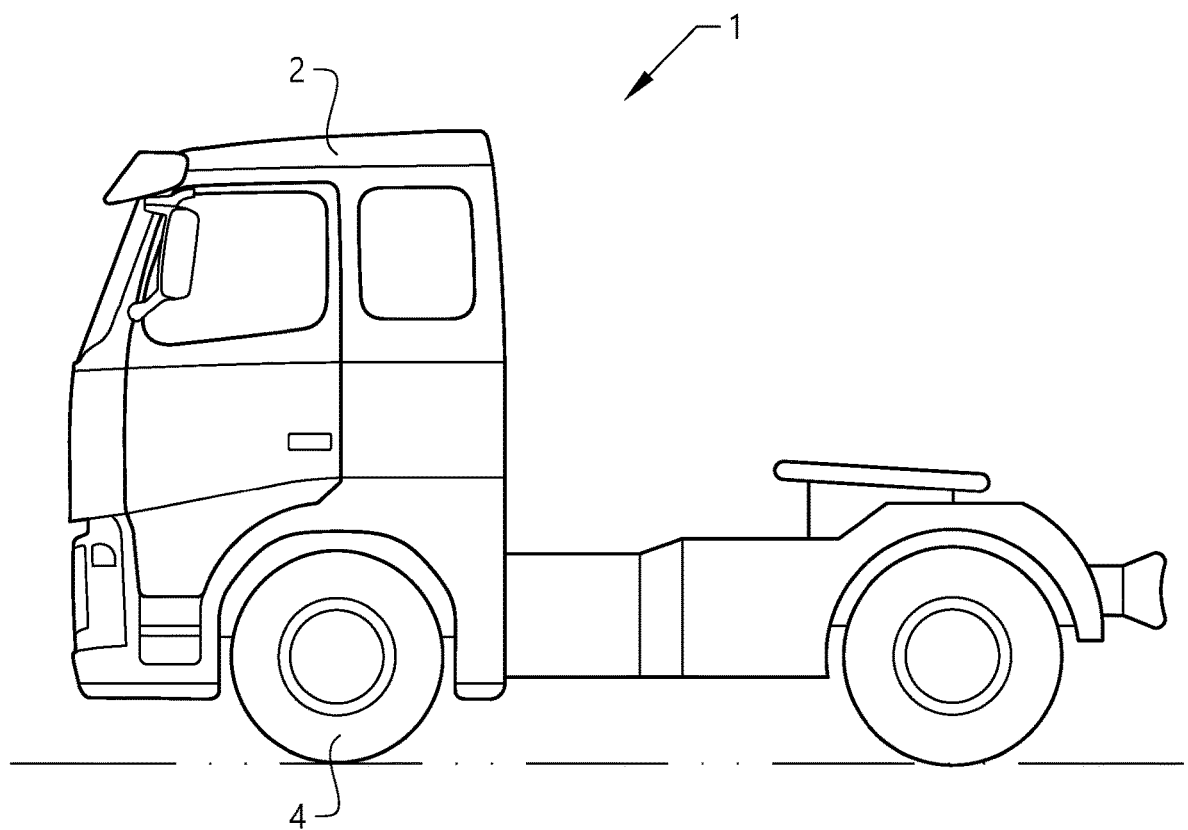
FIG. 1 illustrates a vehicle, in accordance with at least one exemplary embodiment of the invention.

FIG. 1 illustrates a vehicle 1, in accordance with at least one exemplary embodiment of the invention. Although the vehicle 1 is illustrated in the form of a truck, other types of vehicles, such as busses, construction equipment, trailers or passenger cars may be provided in accordance with the invention.

The truck (vehicle) comprises a cab 2 in which a driver may operate the vehicle 1. The vehicle 1 comprises a number of road wheels 4, herein illustrated as two pairs of wheels, however in other embodiments there may be a different number of wheels, such as three pairs, four pairs or more. The rotation of the wheels 4 is facilitated by means of wheel end bearings (not shown in FIG. 1). The vehicle comprises 1 a processing circuitry and a temperature sensor (neither one shown in FIG. 1), which will be further discussed in the following. Although FIG. 1 may illustrate a human-operated vehicle, in other exemplary embodiments, the vehicle in FIG. 1 may represent an autonomous vehicle.

Figure 2:
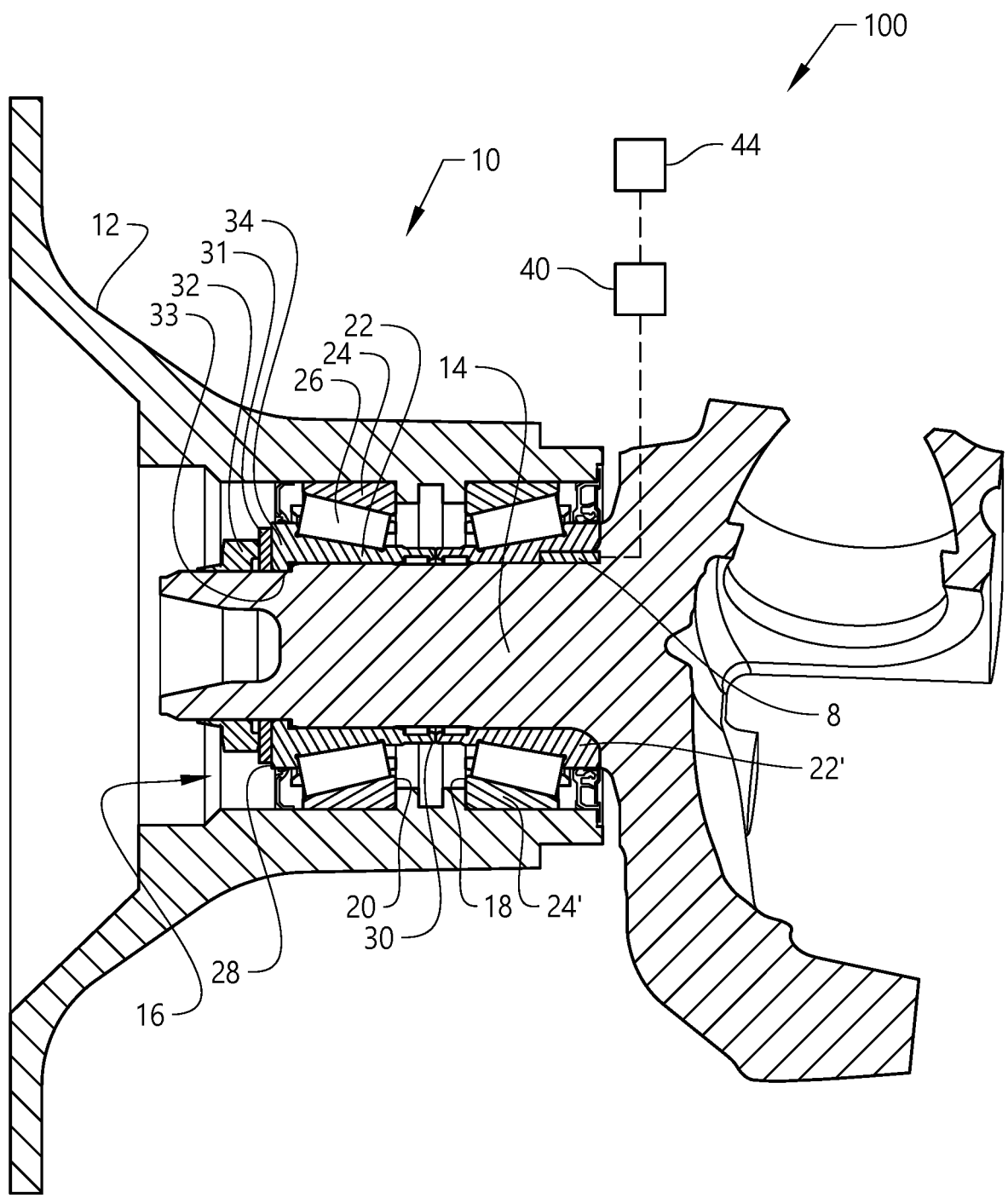
FIG. 2 illustrates a system in accordance with at least one exemplary embodiment of the invention, wherein the system is configured to determine that a failure has occurred at or in a wheel end bearing of a vehicle.

FIG. 2 illustrates a system 100 in accordance with at least one exemplary embodiment of the invention, wherein the system 100 is configured to determine that a failure has occurred at or in a wheel end bearing of a vehicle. The system 100 is provided at a wheel end assembly 10. The system 100 may suitably be implemented in a vehicle such as the vehicle 1 illustrated in FIG. 1. The wheel end assembly 10 comprises a wheel end hub 12, which is configured to receive and hold a road wheel (not illustrated in FIG. 2). The wheel end hub 12 is rotationally mounted to a central wheel support member 14 via a wheel end bearing 16.

In FIG. 2 the central wheel support member 14 has been illustrated in the form of a steering knuckle, which may typically be provided at the front wheels of a vehicle. The knuckle is solid and used for non-driven wheels. However, it should be understood that the inventive principle could also be used in relation to a wheel support member in the form of a hollow spindle. A hollow/tubular spindle may typically be provided at the rear wheels of a vehicle and is used in connection with driven wheels. Normally, a drive shaft or axle extends through the spindle and is fixed to the outside of the wheel end hub for propulsion of the wheel.

The wheel end bearing 16 comprises an inboard bearing 18 and an outboard bearing 20, each of which is concentrically arranged around the central wheel support member 14. Of the two, it is the inboard bearing 18 which is configured to be located closest to a central longitudinal axis of the vehicle. Conversely, of the two, it is the outboard bearing 20 which is configured to be located furthest away from the central longitudinal axis of the vehicle.

The outboard bearing 20 comprises an inner-race forming part 22 and an outer race-forming part 24. The outboard bearing 20 also comprises roller elements 26 accommodated between the inner race-forming part 22 and the outer race-forming part 24. The roller elements 26 may suitably be circumferentially separated from each other by a cage having individual holes for each roller element. The relative motions of the inner and outer race-forming parts 22, 24 causes the roller elements 26 to roll with very little rolling resistance. The inner race-forming part 22 may also be referred to as an inner ring and the outer race-forming part 24 may also be referred to as an outer ring. In a similar way, the inboard bearing 18 comprises roller elements accommodated between an inner race-forming part 22' and an outer race-forming part 24'.

The outboard bearing 20 has an outboard periphery 28 intended to face away from the central longitudinal axis of the vehicle and an inboard periphery 30 intended to face towards the central longitudinal axis of the vehicle.

A lock washer 31 is provided at the outboard periphery 28 of the inner-race-forming part 22. A hub nut 32, which comprises an inner threading is mounted to the central wheel support member 14, which has corresponding outer threading, allowing the hub nut 32 to be threaded onto the central wheel support member 14. The hub nut 32 is tightened to come into contact with a lock washer 31, thus arranged between the hub nut 32 and the inner race-forming part 22, in particular with the outboard periphery 28 of the inner race-forming part 22.

In its turn, the inner race-forming part 22 of the outboard bearing 20 (and similarly the inner race-forming part 22' of the inboard bearing 18) is mounted to the central wheel support member 14.

The system 100 also comprises a temperature sensor 8 provided at or in the wheel end bearing 16.

As illustrated in FIG. 2, the temperature sensor 8 may be located at or in the inboard bearing 18. However, in other exemplary embodiments it is conceivable to provide the temperature sensor 8, or an additional temperature sensor, at or in the outboard bearing 20.

As illustrated in FIG. 2, the temperature sensor 8 may be located at an inboard side of the inboard bearing 18. However, in other exemplary embodiments it is conceivable to provide the temperature sensor 8, or an additional temperature sensor, at an outboard side of the inboard bearing 18.

As illustrated in FIG. 2, the temperature sensor 8 may be located at the inner race-forming part 22' of the inboard bearing 18. However, in other exemplary embodiments it is conceivable to provide the temperature sensor 8, or an additional temperature sensor, at the outer race-forming part 24' of the inboard bearing 18.

FIG. 2 further illustrates that the temperature sensor 8 may be located between the inboard bearing 18 (such as at its inner race-forming part 22') and the central wheel support member 14. The central wheel support member 14 may form part of the system 100 in at least some exemplary embodiments.

The temperature sensor 8 measures the temperature of the wheel end bearing 16. The temperature sensor 8 is configured to transmit measurement signals which may contain the measured value or a representation of the measured value of the temperature of the wheel end bearing 16.

The system 100 further comprises a processing circuitry 40 configured to receive the transmitted measurement signal. The processing circuitry 40 may include a microprocessor, microcontroller, programmable digital signal processor or another programmable device. The processing circuitry 40 may also, or instead, include an application specific integrated circuit, a programmable gate array or programmable array logic, a programmable logic device, or a digital signal processor. Where the processing circuitry 40 includes a programmable device such as the microprocessor, microcontroller or programmable digital signal processor mentioned above, the processor may further include computer executable code that controls operation of the programmable device.

The system 100 also comprises a device 44 with which the processing circuitry 40 communicates and may send warnings related to detected bearing failure. Said device 44 may, for instance, be in the form of a user interface (e.g. in the case of the system 100 being implemented in a human-operated vehicle) or in the form of a control unit (e.g. in the case of the system 100 being implemented in an autonomous vehicle).

The processing circuitry 40 may also comprise software for calculating an estimated value of the temperature of the wheel end bearing 16. The calculation may be based on a mathematical model as already explained above. Thus, the calculation may include input (either directly or via some other component) to the processing circuitry 40 from other sensors, such as a brake pressure sensor (not shown) and a wheel speed sensor (not shown), etc.

The processing circuitry 40 is configured to compare the estimated value with the measured value, the latter having been acquired with the aid of the temperature sensor 8. The processing circuitry 40 may suitably have an electronic memory, in which a predefined difference threshold is stored. The processing circuitry 40 is configured to determine that a failure has occurred when the measured value deviates from the estimated value by said predefined difference of more. In case of the determination by the processing circuitry 40 that a failure has occurred, information thereof, suitably in the form of data, is sent from the processing circuitry 40 to the device 44 (which may e.g. be in the form of a user interface or a control unit), whereby appropriate action may be taken in due time before the failure grows/becomes more serious or starts affecting other components with the risk of secondary failures arising.

Figure 3:
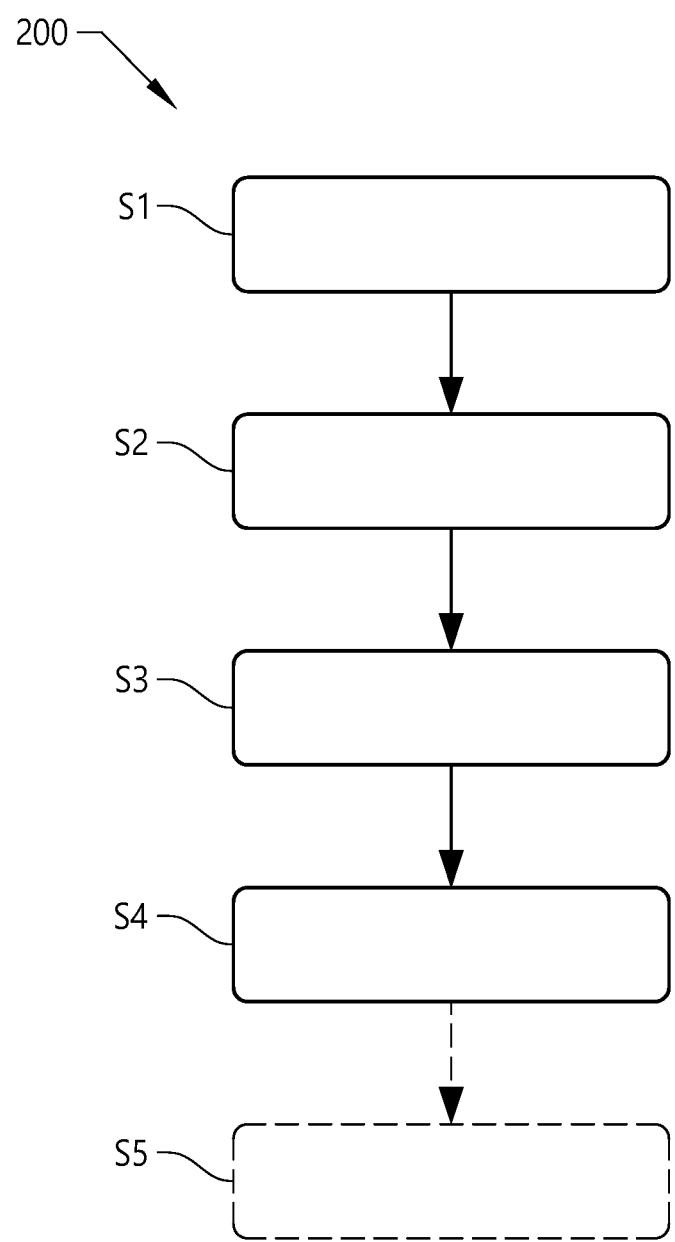
FIG. 3 is a schematic illustration of a method in accordance with at least one exemplary embodiment of the invention.

FIG. 3 is a schematic illustration of a method 200 in accordance with at least one exemplary embodiment of the invention. The method 200 is a method of determining that a failure has occurred at or in a wheel end bearing of a vehicle (such as wheel end bearing 16 illustrated in FIG. 2). The method 200 comprises:

in a step S1, calculating, using a processing circuitry, an estimated value of the temperature of the wheel end bearing, in a step S2, acquiring, using a temperature sensor, a measured value of the temperature of the wheel end bearing, in a step S3, comparing, using the processing circuitry, the measured value with the estimated value, and in a step S4, determining, using the processing circuitry, that a failure has occurred when the measured value deviates from the estimated value by a predefined difference or more.

It should be noted that the steps S1-S4 do not always have to be performed as consecutive steps. Suitably, steps S1-S2 may be performed simultaneously, as the temperature sensor may continuously measure the temperature of the wheel end bearing and the processing circuitry may continuously calculate an estimated value of the temperature, based on e.g. wheel speed, brake pressure, a stored friction model, a stored temperature conductivity model, etc.

It should be understood that the different mathematical models which the processing circuitry may use for calculating estimated value, may suitably vary from vehicle to vehicle, depending on various factors such as the assembly of parts of the wheel end hub, type of brake (disk/drum), thermal conductivity of the specific materials present for the components in the wheel end hub, dimensions and type of bearing, etc. Irrespective of how the mathematical model or models are designed, they may suitably be tested in laboratory environment and calibrated before implementing them in a processing circuitry of a vehicle to be driven on public roads. Such tests may also be used for selecting said predefined difference. Said predefined difference should be large enough to reduce the risk of incorrect determination of failure. On the other hand, the predefined difference may suitably be chosen so that it is small enough to detect a small failure in time before it grows to become a large and more dangerous failure.

In at least some exemplary embodiments, the step S4 may comprise determining, using the processing circuitry, that a bearing failure has occurred when the measured value is both higher than the estimated value and deviates from the estimated value by said predefined difference or more. In at least some exemplary embodiments, the step S4 may comprise determining, using the processing circuitry, that a brake actuator failure has occurred when the measured value is both lower than the estimated value and deviates from the estimated value by said predefined difference or more.

In at least some exemplary embodiments, the step S1 may comprise:
using a mathematical model which estimates:
change in bearing temperature based on the rotation of the bearing, and
change in temperature coming from brake hardware, such as from friction braking, and which is transferred to the bearing, such as via a wheel end hub.

In at least some exemplary embodiments, the step S1 may comprise:
estimating, using the processing circuitry, the brake energy at each time point, and
inputting, using the processing circuitry, the estimated brake energy into a thermal capacitance model of the brake hardware to estimate a rise or fall in bearing temperature.

The method 200 may optionally comprise:
in a step S5, communicating, from the processing circuitry, to a device that a failure has occurred, when said step of determining has determined that a failure has occurred. In the case of the method 200 being implemented in a human-driven vehicle, said device may be a user interface. In the case of the method 200 being implemented in an autonomous vehicle, said device may be a control unit of the autonomous vehicle.

It is to be understood that the present invention is not limited to the embodiments described above and illustrated in the drawings; rather, the skilled person will recognize that many changes and modifications may be made within the scope of the appended claims.

The invention claimed is:

1. A method of determining that a failure has occurred at or in a wheel end bearing of a vehicle, the method comprising:
calculating, using a processing circuitry, an estimated value of a temperature of the wheel end bearing based on operating conditions of the wheel end bearing,
acquiring, using a temperature sensor, a measured value of the temperature of the wheel end bearing,
comparing, using the processing circuitry, the measured value with the estimated value, and
determining, using the processing circuitry, that the failure has occurred when the measured value deviates from the estimated value by at least a predefined difference.

2. The method of claim 1, wherein the step of determining further comprises:
determining, using the processing circuitry, that a bearing failure has occurred when the measured value is both higher than the estimated value and deviates from the estimated value by at least the predefined difference.

3. The method of claim 1, wherein the step of determining further comprises:
determining, using the processing circuitry, that a brake actuator failure has occurred when the measured value is both lower than the estimated value and deviates from the estimated value by at least the predefined difference.

4. The method of claim 1, wherein the step of calculating further comprises:
using a mathematical model which estimates:
a change in bearing temperature based on rotation of the bearing, and
a change in temperature coming from brake hardware which is transferred to the bearing.

5. The method of claim 4, comprising:
estimating, using the processing circuitry, a brake energy at each time point of the plurality of time points, and
inputting, using the processing circuitry, the estimated brake energy into a thermal capacitance model of the brake hardware to estimate a rise or fall in bearing temperature.

6. The method of claim 1, further comprising:
when the vehicle is a human-driven vehicle, communicating from the processing circuitry to a user interface that a failure has occurred, when the determining has determined that a failure has occurred, and
when the vehicle is an autonomous vehicle, communicating from the processing circuitry to a control unit of the autonomous vehicle that a failure has occurred, when the determining has determined that a failure has occurred.

7. A computer program product comprising a non-transitory computer readable medium having stored thereon a computer program comprising instructions to cause processing circuitry to execute the method of claim 1 when the program is run on a computer.

8. A processing circuitry for determining that a failure has occurred at or in a wheel end bearing of a vehicle, the processing circuitry being configured to perform the steps performed by the processing circuitry in the method of claim 1.

9. A system for determining that a failure has occurred at or in a wheel end bearing of a vehicle comprising:
a processing circuitry configured to calculate an estimated value of a temperature of the wheel end bearing based on operating conditions of the wheel end bearing, and
a temperature sensor configured to acquire a measured value of the temperature of the wheel end bearing,
wherein the processing circuitry is configured to compare the measured value with the estimated value, and
wherein the processing circuitry is configured to determine that the failure has occurred when the measured value deviates from the estimated value by at least a predefined difference.

10. The system of claim 9, wherein the processing circuitry is configured to determine that a bearing failure has occurred when the measured value is both higher than the estimated value and deviates from the estimated value by at least the predefined difference.

11. The system of claim 9, wherein the processing circuitry is configured to determine that a brake actuator failure has occurred when the measured value is both lower than the estimated value and deviates from the estimated value by at least the predefined difference.

12. The system of claim 11, wherein the processing circuitry is configured to:
  estimate a brake energy at each time point of the plurality of time points, and
  input the estimated brake energy into a thermal capacitance model of brake hardware to estimate a rise or fall in the bearing temperature.

13. A vehicle comprising the system of claim 9.

14. The vehicle of claim 13:
  wherein the vehicle is a human-driven vehicle,
  wherein the vehicle comprises a user interface, and
  wherein the processing circuitry is configured to communicate to the user interface that a failure has occurred, when the processing circuitry has determined that a failure has occurred.

15. The vehicle of claim 13:
  wherein the vehicle is an autonomous vehicle,
  wherein the vehicle comprises a control unit, and
  wherein the processing circuitry is configured to communicate to the control unit that a failure has occurred, when the processing circuitry has determined that a failure has occurred.

\* \* \* \* \*